UNITED STATES PATENT OFFICE.

N. H. CHESEBROUGH, OF NEW YORK, N. Y., ASSIGNOR TO THOMAS G. VAN COTT, OF SAME PLACE.

IMPROVED COMPOUND FOR THE CURE OF DYSPEPSIA, &c.

Specification forming part of Letters Patent No. 54,056, dated April 17, 1866.

*To all whom it may concern:*

Be it known that I, NICHOLAS H. CHESEBROUGH, of the city and State of New York, physician, have invented and made an Improved Compound for the Cure of Dyspepsia, Costiveness, Flatulence, and Loss of Appetite; and I do hereby declare the following to be a full, clear, and exact description of the said invention and the mode of compounding the same.

I take equal parts, or nearly so, of powdered aloes, powdered rhubarb, powdered ginger, gentian-root, bruised, and coriander-seed, bruised. I mix these ingredients thoroughly together. I mix brandy and water together in equal parts, and to every pint thereof I add one ounce of the ingredients mixed as above, and allow the same to digest for seven days, and then filter the liquid.

This compound or preparation is to be taken in quantities varying from a tea-spoonful to a table-spoonful, and will be the most effective when employed shortly before meals.

What I claim, and desire to secure by Letters Patent, is—

The compound formed of the ingredients and for the purpose specified.

In witness whereof I have hereunto set my signature this 21st day of December, A. D. 1865.

N. H. CHESEBROUGH.

Witnesses:
   GEO. D. WALKER,
   CHAS. H. SMITH.